No. 815,312. PATENTED MAR. 13, 1906.
C. G. SPRADO.
ADJUSTABLE PISTON ROD AND CROSS HEAD CONNECTION.
APPLICATION FILED SEPT. 14, 1905.

WITNESSES:
Ed. Strothman
Geo E Kirk

Carl G. Sprado INVENTOR
BY
G. F. DeWein ATTORNEY.

UNITED STATES PATENT OFFICE.

CARL G. SPRADO, OF MILWAUKEE, WISCONSIN, ASSIGNOR TO ALLIS-CHALMERS COMPANY, OF MILWAUKEE, WISCONSIN, A CORPORATION OF NEW JERSEY.

ADJUSTABLE PISTON-ROD AND CROSS-HEAD CONNECTION.

No. 815,312.  Specification of Letters Patent.  Patented March 13, 1906.

Application filed September 14, 1905. Serial No. 278,395.

*To all whom it may concern:*

Be it known that I, CARL G. SPRADO, a citizen of the United States, residing at Milwaukee, in the county of Milwaukee and State of Wisconsin, have invented certain new and useful Improvements in Adjustable Piston-Rod and Cross-Head Connections, of which the following is a specification.

This invention relates to certain improvements in adjustable piston-rod and cross-head connections, and is specially adapted to those forms of rod which are not rotatable. It is peculiarly valuable in those structures which have a piston of different shape at top and bottom and in a water-cooled piston, in the latter of which it is desirable to keep the outlet on top. To accomplish this adjustment, I have devised a compact structure, herewith disclosed, which may be operated without necessity of taking any of the machine apart. Further advantages are apparent when this device is used with the incased cross-head.

Figure 1:
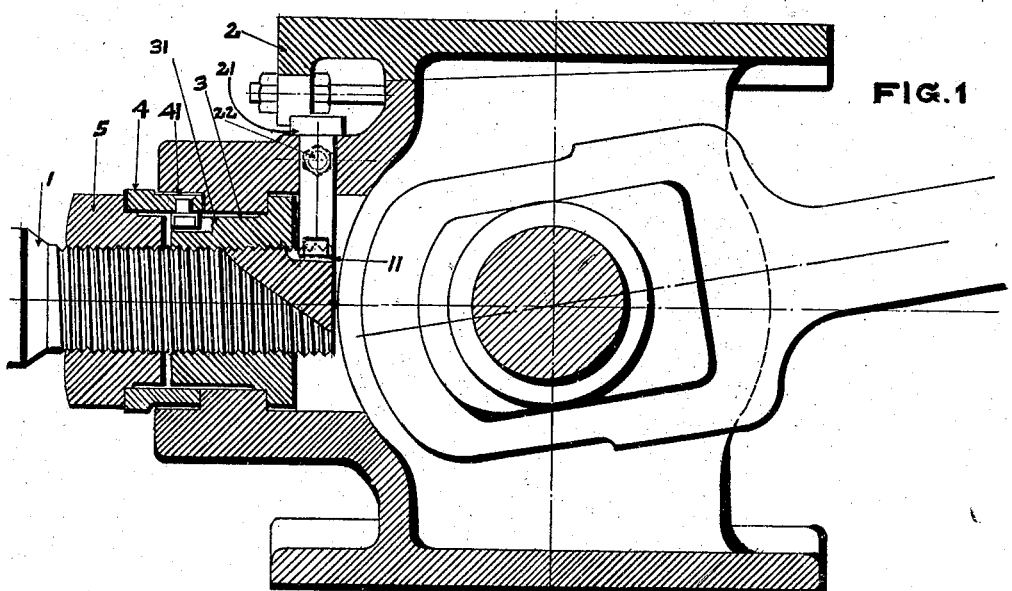
Figure 2:
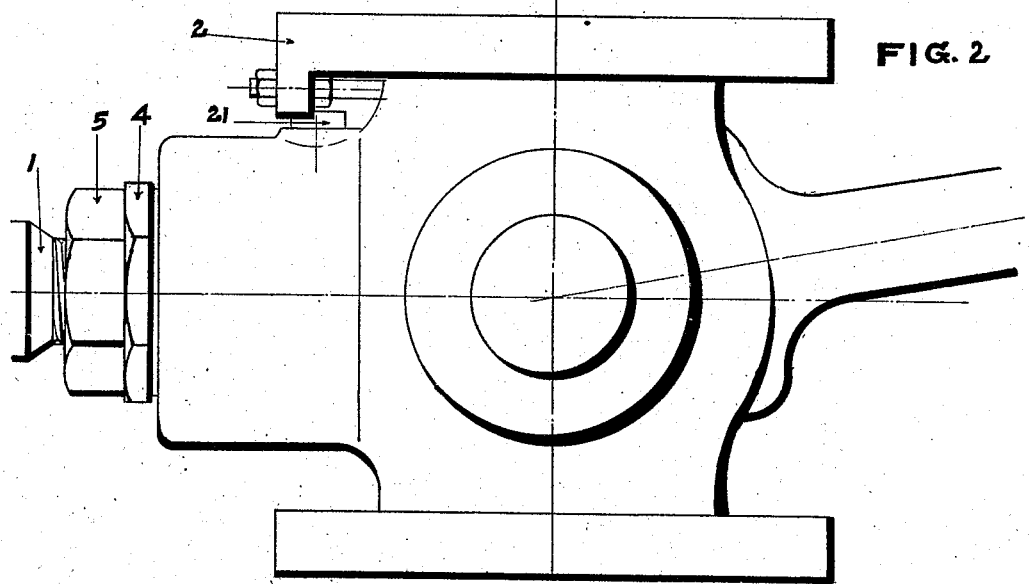

Figure 1 is a vertical section through a cross-head in which my adjusting device is shown. Fig. 2 is a side elevation thereof.

In the drawings the rod is shown as a piston-rod 1 and is connected to the cross-head 2 by my improved adjusting device. The adjusting device comprises the threaded element or inner nut 3, which is mounted upon the piston-rod 1. A keyway 11 in the piston-rod is engaged by the pin 21 through the cross-head hub, which prevents relative rotation of the rod and cross-head. The pin 21 is held in position by the set-screw 22. The pin 21 also serves as an abutment for the inner nut 3, thereby providing for positive adjustment when the nut 3 is rotated. The adjusting collar or washer 4 has pin 41 engaging way 31 in the nut 3, whereby the rotation of washer 4 by a wrench or spanner will serve to control the movement of the inner nut 3. When the adjustment has been completed, the lock-nut 5 is rotated to hold the collar 4.

It will be obvious that any means other than 21 may be used to prevent rotation of the piston-rod.

The collar 4, while serving as an actuator for the nut 3 through the pin 41 or any similar engaging means, also serves as a washer for the lock-nut 5.

What I claim as my invention, and desire to secure by Letters Patent, is—

1. A rod, a member connected thereto and an adjusting device between said rod and member comprising an element engaging said rod, locking means and an actuator for said element.

2. A rod, a member connected thereto and an adjusting device between said rod and member comprising a threaded element mounted on said rod, locking means and an actuator for said element.

3. A rod, a member connected thereto and a positive-adjusting device between said rod and member comprising an element engaging said rod, means to control said element, and a second element to lock said means.

4. A non-rotatable rod, a member reciprocated thereby and an adjusting device between said rod and member comprising an element engaging said rod, and means to control said element.

5. A non-rotatable rod, a member reciprocated thereby and an adjusting device between said rod and member comprising an element engaging said rod, means to control said element, and a second element to lock said means.

6. A rod, a member connected thereto, a pin to hold said rod from rotation and a positive adjusting device between said rod and member comprising an element engaging said rod, and means to control said element.

7. A rod, a member connected thereto, a pin to hold said rod from rotation and a positive adjusting device between said rod and member comprising a threaded element mounted on the rod and abutting said pin, means to control said element, and a second element to lock said means.

In testimony whereof I affix my signature in presence of two witnesses.

CARL G. SPRADO.

Witnesses:
JOHN DAY, Jr.,
G. F. DE WEIN.